INVENTOR
RICHARD G. CUTLER
Williamson Palmatier
& Bains
ATTORNEYS

United States Patent Office 3,554,586
Patented Jan. 12, 1971

3,554,586
BALL-AND-SOCKET JOINT
Richard G. Cutler, Hollage, Germany, assignor to Messrs.
Elastogran G.m.b.H., Hannover, Germany, a corporation of Germany
Filed July 8, 1969, Ser. No. 839,964
Claims priority, application Germany, July 10, 1968,
1,775,151; June 26, 1969, 1,932,520
Int. Cl. F16c 11/06
U.S. Cl. 287—87                                     4 Claims

ABSTRACT OF THE DISCLOSURE

A ball-and-socket joint with a housing for the bearing of the ball end of the ball pin, the bearing having an outer shape mating with a cylindrical-trunconical bore in the housing and being forced into the cone portion by exerting a force onto the upper bearing face, transmitted by resilient projections of the bearing, the projections being designed to freely expand perpendicularly with respect to the force direction in order to provide sufficient pre-stress in spite of the bearing being shifted into the cone during use of the joint.

BRIEF SUMMARY OF THE INVENTION

The invention concerns a ball-and-socket joint comprising a socket body and a ball pin, the latter being received in a bearing made of resilient material which defines a spherical cavity for the wall and fits into a bore extending through the socket body. One mouth of the bore is provided for insertion of the ball pin and is closed thereafter by a cover.

It is well known that these bearings which support the ball pin within the socket body are subjected to a considerable wear and tear even if they are made from resilient material. This wear interfering with the proper function of the joint, it has already been proposed to reduce it by exerting a force onto the upper bearing portion by means of a spring. The wear has not been compensated, however, in the lower portion of the bearing adjacent the ball pin distal end, i.e., in the bearing zone which is subjected to the highest load.

Bearings have been provided with slots or with wedging means to cater with these drawbacks but after a certain time of use joints of this type got jammed.

It is the object of the present invention to provide an improved ball-and-socket joint of the type as mentioned above in which the drawbacks hitherto observed are eliminated.

It is a further object of the present invention to provide an improved ball-and-socket joint to be inexpensively manufactured.

It is yet a further object of the present invention to provide a ball-and-socket joint having an integral bearing-and-spring member.

It is a still further object of the present invention to provide a ball-and-socket joint having a bearing with projection means integrally formed therewith and acting as pre-stressing means, in which the overall dimension of said projections is not critical.

In accordance with the invention, the bore which extends through the socket body has a first cylindrical portion adjacent the cover closing the bore mouth through which the ball pin has been inserted, and a second portion in which the cylindrical portion tapers so that the cylindrical portion is followed by a trunconical portion, the smaller diameter of which is adjacent the other mouth of the bore. The bearing fits into the bore so that its outer shape is likewise cylindrical-trunconical, mating with the inner bore surface. However, the trunconical portion of the bearing is somewhat shorter than the tapering portion of the bore so that a certain clearance will be provided and the bearing does not abut the flange which surrounds the lower bore mouth. The end face of the bearing opposite the cover is provided with one or more projections, for example, with outwardly extending protuberances. When assembling the joint, the cover presses onto the projections thereby generating a pre-stress in the bearing. As soon as a certain wear between the ball and the bearing either in the upper or in the lower portion of the latter will occur, the entire bearing will be forced into the cone thereby assuring that even in case of wear or tear the tight contact engagement between ball and bearing will be maintained over the entire surfaces.

The degree of resilience of the projections depends upon the elasticity of the material and of the dimension and shape of the projections. Since the cover will be pressed down in engagement with a shoulder provided at the upper bore mouth, the resulting force will depend upon the height of the projections and upon their lateral dimensions. If, for example, the bearing is provided with an annular protuberance, the latter will, in response to a pressure exerted upon its face in engagement with the cover, be deformed in radial direction. Its elasticity will therefore be rather low and even a small compression of the annular projection will develop a rather high pre-stress. In consequence, the height of the annular projection must be accurately controlled during manufacture; the tolerances are very tight. Of course, tight tolerances are always undesirable from the expense point of view. Moreover, if the bearing will be forced downwardly after a certain time of use the compression of the projection will be correspondingly reduced by the same amount. In case of an annular projection, such decrease will be subtracted from the original compression which itself was small so that the percentage of reduction will be correspondingly great and, in consequence, the pre-stress will be considerably reduced already after a short time of use. This again is undesirable. On the other hand, it is not feasible to provide a rather thin and high annular projection because of its tendency to bend or plastically deform.

Therefore, it is preferred to provide a multiplicity of protuberances each being apt to deform in the two directions transverse to the axial direction of a force exerted thereupon. Such protuberances must be designed higher than an annular projection having the same sectional area in order to provide the same amount of pre-stress but they have, on the other hand, much less tendency to bend or creep. The absolute accuracy of manufacture being substantially the same as for an annular projection, the relative accuracy, of course, will be better so that the overall performance can be improved by providing such protuberances.

The invention will be explained in detail hereinunder with reference to the accompanying drawings which show preferred embodiments of the improved joint.

Figure 1:
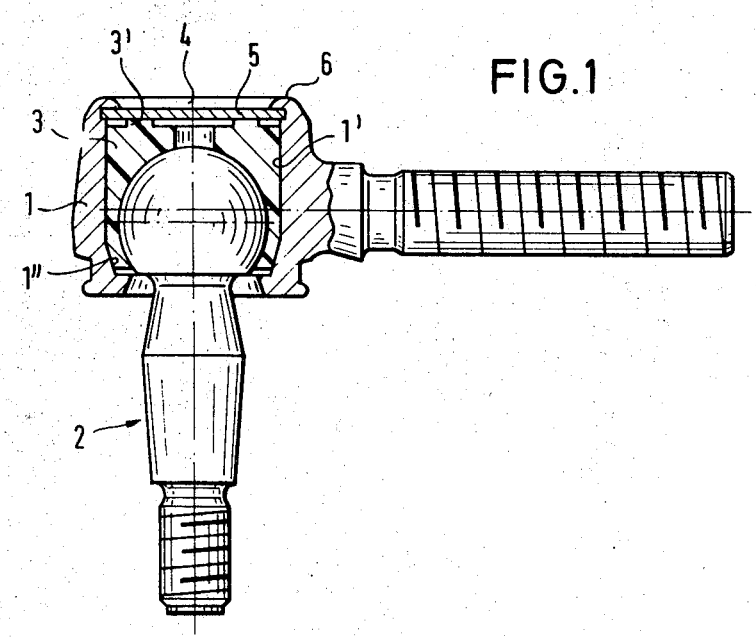
FIG. 1 shows a side elevation, partly in section, of a ball-and-socket joint in accordance with the invention.

In the drawing, the socket body has generally been designated with 1. The ball pin is received with its ball end in the bearing 3 made of resilient material, the bearing fitting into the bore of the socket body. The bore comprises a first cylindrical portion 1' and a second trunconical portion 1", portions 1' and 1" being joined at the greater diameter of the tapered portion 1". The bore is packed by mating bearing 3 which is provided with projection means 3' opposite the cover 5. The cover 5 which closes the mouth 4 of the bore 1' is pressed onto the bearing 3 by peening a body lip 6 inwardly thereby generating a pre-tension or pre-stress in the bearing. If wear and tear occur, in particular in the lower portion of the bearing, due to this pre-stress the entire bearing 3 will be forced downwardly so that continuously a proper support for the pin is provided.

Figure 4:
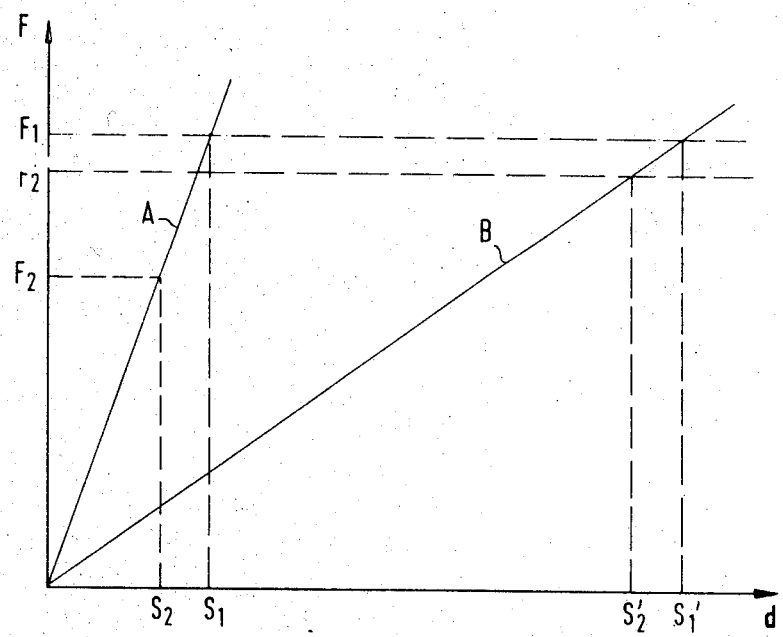
FIG. 4 is a diagram to explain the function of the projection means of the joint shown in FIG. 1.

The projection means may be annular or may have the form of individual protuberances for reasons explained above. FIG. 4 shows the force generated in downward direction plotted over the compression of the projections. The resulting curves for annular projection means A and individual protuberances B are shown as straight lines for sake of simplicity although it is understood that in fact they will be non-linear; however, the following assumptions will be applicable too.

Assembling of the joint will compress the annular projection by a value $S_1$ and a downward force $F_1$ will be generated. If a certain wear has taken place and the bearing will have been forced into the cone in accordance with the invention, the compression will be correspondingly reduced to another value $S_2$ and the remaining pre-stress will be reduced to $F_2$.

The protuberance projections provide a softer spring characteristic B and a greater compression $S_1$ is required to generate the same force value $F_1$. However, if $S_1$ will be reduced to $S_2$ by the same amount of bearing shift as for curve A, the resulting force will be $F_2$ which is obviously much closer to $F_1$ than $F_2$.

Figure 2:
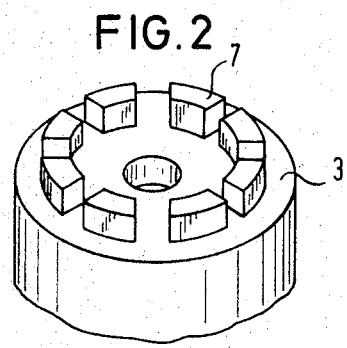
FIGS. 2 and 3 show details of preferred embodiments.

FIG. 2 shows the upper portion of the bearing adjacent the cover 5 (not shown). The projection means are designed as short ribs 7 extending from the upper face of the bearing in a star configuration. The ribs 7 may expand in any direction perpendicularly with respect to the direction of the force exerted thereon by the cover.

Figure 3:
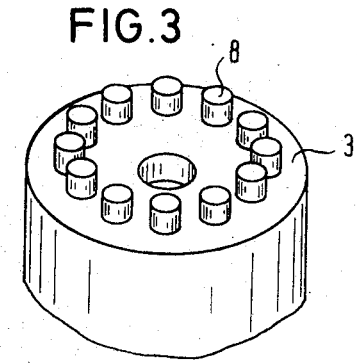

FIG 3 shows in the same manner as FIG. 2 projection means 8 having a cylindrical shape and being arranged equidistantly along a circle on the upper bearing face. The small cylindrical protuberances 8 will be deformed in quite a uniform manner so that they can be considerably long without the risk of bending or creeping.

It will be understood that the particular shape of the projection means can be varied by an expert skilled in the art without deviating from the spirit of the invention the scope of which will be defined by the following claims.

What I claim is:
1. A ball-and-socket joint comprising
   a socket body with a bore extending therethrough,
   a bearing made of resilient material fitting into said bore and defining a spherical cavity in which the ball end of the ball pin is received,
   a cover closing the mouth of the bore remote from the distal end of the ball pin, said bore having a first cylindrical portion adjacent said cover which terminates in a second inwardly tapering portion, said bearing having a cylindrical-trunconical shape mating with the internal bore surface and being provided with projection means extending axially from its face adjacent said cover, the trunconical portion of the bearing being shorter than the tapering portion of the bore so that the bearing face adjacent the ball pin distal end is spaced from the uncovered bore mouth, said cover being pressed onto said projection means thereby generating a pre-stress in the bearing to force it into said tapering bore portion.

2. A ball-and-socket joint as claimed in claim 1 in which the projection means comprises a multiplicity of protuberances each being apt to expand in the two directions transevrse to and in response to a force exerted upon by the cover.

3. A ball-and-socket joint as claimed in claim 2 in which the protuberances are ribs extending from the bearing face in a star configuration.

4. A ball-and-socket joint as claimed in claim 2 in which cylindrical protuberances are equidistantly disposed posed along a circle on the bearing face.

References Cited
UNITED STATES PATENTS

| | | | |
|---|---|---|---|
| 3,063,744 | 11/1962 | Flumerfelt | 287—87 |
| 3,352,583 | 11/1967 | Patton | 287—93 |

OTHER REFERENCES

German printed application No. 1,010,392, June 1957, Ulderup, 287—90A.

DAVID J. WILLIAMOWSKY, Primary Examiner

A. V. KUNDRAT, Assistant Examiner